United States Patent
Cutsforth et al.

(10) Patent No.: US 12,418,151 B2
(45) Date of Patent: Sep. 16, 2025

(54) SYSTEM AND METHOD FOR MONITORING THE STATUS OF ONE OR MORE COMPONENTS OF AN ELECTRICAL MACHINE

(71) Applicant: CUTSFORTH, INC., Minneapolis, MN (US)

(72) Inventors: Robert S. Cutsforth, Bellingham, WA (US); Dustin L. Cutsforth, Leawood, KS (US); Douglas Christopher Bruey, Seattle, WA (US); Michael Lee Schaaf, Seattle, WA (US); David William Drury Harrison, Seattle, WA (US)

(73) Assignee: CUTSFORTH, INC., Minneapolis, MN (US)

( * ) Notice: Subject to any disclaimer, the term of this patent is extended or adjusted under 35 U.S.C. 154(b) by 0 days.

(21) Appl. No.: 18/660,394

(22) Filed: May 10, 2024

(65) Prior Publication Data
US 2024/0291217 A1 Aug. 29, 2024

Related U.S. Application Data

(63) Continuation of application No. 17/529,521, filed on Nov. 18, 2021, now Pat. No. 12,003,067, which is a
(Continued)

(51) Int. Cl.
*H02K 11/20* (2016.01)
*G01B 21/22* (2006.01)
(Continued)

(52) U.S. Cl.
CPC ............ *H01R 39/58* (2013.01); *G01B 21/22* (2013.01); *H01R 39/26* (2013.01); *H01R 39/38* (2013.01); *H02K 11/20* (2016.01)

(58) Field of Classification Search
CPC ........ H02K 11/20; H02K 11/13; H01R 39/58; H01R 39/26; H01R 39/38
(Continued)

(56) References Cited

U.S. PATENT DOCUMENTS 1,307,028 A 6/1919 Sweet
2,935,632 A 5/1960 Schmitz
(Continued)

FOREIGN PATENT DOCUMENTS

AU 2008256639 B2 2/2014
AU 2016271337 B2 7/2018
(Continued)

OTHER PUBLICATIONS

Wurfel et al. "Monitoring and diagnostics of the rotor slip ring system of three phase current induction generators" University of Technology Chemnitz, D-09126 Chemnitz, Germany.
(Continued)

*Primary Examiner* — Jose A Gonzalez Quinones
(74) *Attorney, Agent, or Firm* — Seager, Tufte & Wickhem LLP

(57) ABSTRACT

A system for monitoring the wear state of a carbon brush of a brush holder assembly in which the length of the carbon brush is diminished from an initial length as an end of the carbon brush wears away during use. The system includes a wear state monitor, including a sensor, coupled to the carbon brush. The wear state monitor is configured to rotate as the length of the carbon brush diminishes. The sensor is configured to measure an angular displacement of the wear state monitor as the wear state monitor rotates. The measured angular displacement of the wear state monitor correlates to an amount of diminution in the length of the carbon brush.

19 Claims, 8 Drawing Sheets

Related U.S. Application Data continuation of application No. 16/592,269, filed on Oct. 3, 2019, now Pat. No. 11,211,757.

(60) Provisional application No. 62/741,152, filed on Oct. 4, 2018.

(51) Int. Cl.
*H01R 39/26* (2006.01)
*H01R 39/38* (2006.01)
*H01R 39/58* (2006.01)
*H02K 13/00* (2006.01)

(58) Field of Classification Search
USPC .................................. 310/68 B, 242
See application file for complete search history.

(56) References Cited

U.S. PATENT DOCUMENTS

| | | |
|---|---|---|
| 3,523,288 A | 8/1970 | Thompson |
| 3,534,206 A | 10/1970 | Carey |
| 3,634,710 A | 1/1972 | Woda |
| 3,641,379 A | 2/1972 | Vick |
| 4,024,525 A | 5/1977 | Baumgartner et al. |
| 4,058,804 A | 11/1977 | Sawada et al. |
| 4,121,207 A | 10/1978 | Jones |
| 4,172,988 A | 10/1979 | Lowther |
| 4,272,695 A | 6/1981 | Buchwald et al. |
| 4,316,186 A | 2/1982 | Purdy et al. |
| 4,329,611 A | 5/1982 | Ohmstedt et al. |
| 4,329,683 A | 5/1982 | Kimberlin |
| 4,333,095 A | 6/1982 | Silva |
| 4,334,072 A | 6/1982 | Becker et al. |
| 4,344,009 A | 8/1982 | Reynolds |
| 4,344,072 A | 8/1982 | Harper |
| 4,348,608 A | 9/1982 | Michael |
| 4,355,254 A | 10/1982 | Oki et al. |
| 4,359,685 A | 11/1982 | Eguchi et al. |
| 4,390,870 A | 6/1983 | Michael |
| 4,400,638 A | 8/1983 | Albrecht et al. |
| 4,420,705 A | 12/1983 | Kimberlin |
| 4,488,078 A | 12/1984 | Orton |
| 4,513,495 A | 4/1985 | Kimberlin |
| 4,528,556 A | 7/1985 | Maddox |
| 4,528,557 A | 7/1985 | Braun |
| 4,536,670 A | 8/1985 | Mayer |
| 4,542,374 A | 9/1985 | Kollmannsberger et al. |
| 4,577,151 A | 3/1986 | Tanisaka et al. |
| 4,636,778 A | 1/1987 | Corkran et al. |
| 4,646,001 A | 2/1987 | Baldwin et al. |
| 4,652,783 A | 3/1987 | Cheesmore et al. |
| 4,723,084 A | 2/1988 | Reynolds |
| 4,739,208 A | 4/1988 | Kimberlin |
| 4,743,787 A | 5/1988 | Bunner et al. |
| 4,761,594 A | 8/1988 | Rodi et al. |
| 4,831,302 A | 5/1989 | Dietrich et al. |
| 4,831,602 A | 5/1989 | Kroenert et al. |
| 4,918,348 A | 4/1990 | Fitzsimmons et al. |
| 4,950,933 A | 8/1990 | Pipkin et al. |
| 4,977,345 A | 12/1990 | Toperzer |
| 5,157,372 A | 10/1992 | Langford |
| 5,185,967 A | 2/1993 | Cutsforth |
| 5,229,817 A | 7/1993 | Lange et al. |
| 5,256,925 A | 10/1993 | Cutsforth |
| 5,327,184 A | 7/1994 | Nomura et al. |
| 5,387,831 A | 2/1995 | Yang |
| 5,397,952 A | 3/1995 | Decker et al. |
| 5,463,264 A | 10/1995 | Koenitzer |
| 5,488,261 A | 1/1996 | Swoboda et al. |
| 5,509,625 A | 4/1996 | Oullette et al. |
| 5,621,262 A | 4/1997 | Han |
| 5,643,264 A | 7/1997 | Sherman et al. |
| 5,731,650 A | 3/1998 | Scheucher |
| 5,739,619 A | 4/1998 | Thornley |
| 5,753,992 A | 5/1998 | Avitable et al. |
| 5,753,995 A | 5/1998 | Ogino |
| 5,870,026 A | 2/1999 | Challenger |
| 6,034,531 A | 3/2000 | Senglat et al. |
| 6,067,159 A | 5/2000 | Discenzo et al. |
| 6,111,643 A | 8/2000 | Discenzo et al. |
| 6,255,955 B1 | 7/2001 | Blaettner |
| 6,359,690 B1 | 3/2002 | Discenzo et al. |
| 6,495,940 B2 | 12/2002 | Kliman et al. |
| 6,552,467 B1 | 4/2003 | Suriano et al. |
| 6,580,511 B1 | 6/2003 | Discenzo |
| 6,598,597 B1 | 7/2003 | Marocco et al. |
| 6,652,360 B2 | 11/2003 | Cutsforth |
| 6,731,042 B1 | 5/2004 | Bank et al. |
| 6,933,650 B2 | 8/2005 | Wang |
| 6,960,922 B2 | 11/2005 | Klaar |
| 6,966,754 B2 | 11/2005 | Wobben |
| 6,972,681 B2 | 12/2005 | Matsuoka et al. |
| 7,005,964 B2 | 2/2006 | Edmonson et al. |
| 7,010,959 B2 | 3/2006 | Dingfelder et al. |
| 7,034,430 B2 | 4/2006 | Custforth et al. |
| 7,045,929 B2 | 5/2006 | Yu |
| 7,049,532 B2 | 5/2006 | Kanazawa et al. |
| 7,122,935 B2 | 10/2006 | Custforth et al. |
| 7,141,906 B2 | 11/2006 | Custforth et al. |
| 7,169,022 B2 | 1/2007 | Cutsforth |
| 7,218,028 B2 | 5/2007 | Annis et al. |
| 7,248,142 B2 | 7/2007 | Beck et al. |
| 7,277,004 B2 | 10/2007 | Beck et al. |
| 7,358,640 B2 | 4/2008 | Itou et al. |
| 7,365,470 B1 | 4/2008 | Eger et al. |
| 7,417,354 B2 | 8/2008 | Cutsforth et al. |
| 7,485,882 B2 | 2/2009 | Zombo et al. |
| 7,545,072 B2 | 6/2009 | Cutsforth |
| 7,551,288 B2 | 6/2009 | Discenzo |
| 7,564,160 B2 | 7/2009 | Cutsforth et al. |
| 7,705,744 B2 | 4/2010 | Cutsforth |
| 7,768,174 B2 | 8/2010 | Cutsforth et al. |
| 7,816,834 B2 | 10/2010 | Cutsforth |
| 7,880,362 B2 | 2/2011 | Cutsforth et al. |
| 7,880,363 B2 | 2/2011 | Cutsforth et al. |
| 7,916,038 B2 | 3/2011 | Cutsforth |
| 7,960,892 B2 | 6/2011 | Cutsforth |
| 7,969,059 B2 | 6/2011 | Cacal et al. |
| 7,990,018 B2 | 8/2011 | Cutsforth et al. |
| 7,994,683 B2 | 8/2011 | Cutsforth et al. |
| 8,047,083 B2 | 11/2011 | Puzio et al. |
| 8,054,190 B2 | 11/2011 | Hobelsberger |
| 8,084,704 B2 | 12/2011 | Mark et al. |
| 8,120,503 B2 | 2/2012 | Mark et al. |
| 8,134,472 B2 | 3/2012 | Cutsforth |
| 8,159,396 B2 | 4/2012 | Folden et al. |
| 8,165,552 B2 | 4/2012 | Rofougaran et al. |
| 8,179,014 B2 | 5/2012 | Cutsforth et al. |
| 8,493,707 B2 | 7/2013 | Cutsforth |
| 8,546,993 B2 | 10/2013 | Cutsforth et al. |
| 8,618,943 B2 | 12/2013 | Cutsforth et al. |
| 8,714,860 B2 | 5/2014 | Cutsforth |
| 8,825,800 B2 | 9/2014 | Cutsforth |
| 8,922,092 B2 | 12/2014 | Cutsforth |
| 9,099,827 B2 | 8/2015 | Cutsforth |
| 9,178,327 B2 | 11/2015 | Cutsforth |
| 9,209,667 B2 | 12/2015 | Cutsforth |
| 9,252,643 B2 | 2/2016 | Cutsforth |
| 9,287,674 B2 | 3/2016 | Cutsforth et al. |
| 9,287,675 B2 | 3/2016 | Cutsforth et al. |
| 9,287,676 B2 | 3/2016 | Cutsforth et al. |
| 9,293,879 B2 | 3/2016 | Cutsforth et al. |
| 9,293,880 B2 | 3/2016 | Cutsforth et al. |
| 9,293,881 B2 | 3/2016 | Cutsforth et al. |
| 9,331,555 B2 | 5/2016 | Fish et al. |
| 9,350,130 B2 | 5/2016 | Cutsforth et al. |
| 9,560,729 B2 | 1/2017 | Cutsforth et al. |
| 9,590,375 B2 | 3/2017 | Cutsforth et al. |
| 9,590,376 B2 | 3/2017 | Cutsforth |
| 9,640,930 B2 | 5/2017 | Cutsforth |
| 9,762,016 B2 | 9/2017 | Fish et al. |
| 9,793,670 B2 | 10/2017 | Steinbach et al. |
| 9,874,492 B2 | 1/2018 | Cutsforth |
| 9,917,408 B2 | 3/2018 | Cutsforth |

(56) References Cited

U.S. PATENT DOCUMENTS

| | | |
|---|---|---|
| 10,181,772 B2 | 1/2019 | Cutsforth |
| 10,199,790 B2 | 2/2019 | Cutsforth et al. |
| 10,249,999 B2 | 4/2019 | Cutsforth |
| 10,316,888 B2 | 6/2019 | Cutsforth |
| 10,348,047 B2 | 7/2019 | Cutsforth et al. |
| RE47,563 E | 8/2019 | Cutsforth |
| 10,371,726 B2 | 8/2019 | Jahnke et al. |
| 2001/0043022 A1 | 11/2001 | Narushima et al. |
| 2003/0011388 A1 | 1/2003 | Klaar |
| 2005/0116475 A1 | 6/2005 | Hibi et al. |
| 2006/0021775 A1 | 2/2006 | Duesselberg et al. |
| 2006/0119211 A1* | 6/2006 | Annis ............... H01R 39/381 310/239 |
| 2007/0273165 A1 | 11/2007 | Beck et al. |
| 2008/0101895 A1 | 5/2008 | Holcomb et al. |
| 2008/0264735 A1 | 10/2008 | Matsushita et al. |
| 2008/0291273 A1 | 11/2008 | Cutsforth et al. |
| 2009/0096315 A1 | 4/2009 | Mantle |
| 2009/0153089 A1 | 6/2009 | Hobelsberger |
| 2009/0267782 A1 | 10/2009 | Mark et al. |
| 2011/0210837 A1 | 9/2011 | Jin |
| 2012/0169176 A1 | 7/2012 | Toledo et al. |
| 2012/0206010 A1 | 8/2012 | Kuban et al. |
| 2012/0228988 A1 | 9/2012 | Cutsforth |
| 2012/0248929 A1 | 10/2012 | Fish et al. |
| 2013/0218514 A1 | 8/2013 | Schieke et al. |
| 2014/0009142 A1 | 1/2014 | Cauwenberghs |
| 2014/0052611 A1 | 2/2014 | Cutsforth |
| 2014/0077960 A1 | 3/2014 | Cutsforth |
| 2014/0125206 A1 | 5/2014 | Fish et al. |
| 2014/0265675 A1 | 9/2014 | Cutsforth |
| 2015/0357780 A1 | 12/2015 | Steinbach et al. |
| 2016/0111838 A1* | 4/2016 | Cutsforth ............ H01R 39/381 310/68 B |
| 2017/0098983 A1 | 4/2017 | Cutsforth et al. |
| 2018/0106701 A1 | 4/2018 | Cutsforth |
| 2018/0351439 A1 | 12/2018 | Jahnke et al. |
| 2019/0173250 A1 | 6/2019 | Cutsforth |
| 2019/0207353 A1 | 7/2019 | Cutsforth et al. |
| 2019/0302155 A1 | 10/2019 | Jahnke et al. |

FOREIGN PATENT DOCUMENTS

| | | | |
|---|---|---|---|
| CA | 2688007 A1 | 12/2008 | |
| CA | 2688053 A1 | 12/2008 | |
| CA | 2912493 A1 | 12/2008 | |
| CA | 2918013 A1 | 12/2008 | |
| CA | 2688007 C | 3/2016 | |
| CA | 2918013 C | 7/2018 | |
| CN | 1395343 A | 2/2003 | |
| CN | 1442683 A | 9/2003 | |
| CN | 101369706 A | 2/2009 | |
| CN | 101701791 A | 5/2010 | |
| CN | 105247746 A | 1/2016 | |
| DE | 3417711 A1 | 11/1985 | |
| DE | 19758235 A1 * | 4/1999 | ............ H01R 39/58 |
| DE | 19755232 A1 | 6/1999 | |
| DE | 20003874 U1 | 5/2000 | |
| DE | 202006003418 U1 | 5/2006 | |
| DE | 102005062073 A1 | 7/2007 | |
| DE | 102012102726 A1 | 10/2012 | |
| EP | 0099158 A1 | 1/1984 | |
| EP | 0920092 A2 | 6/1999 | |
| EP | 1090702 A2 | 4/2001 | |
| EP | 1271716 A1 | 1/2003 | |
| EP | 1090702 B1 | 1/2004 | |
| EP | 1439042 A2 | 7/2004 | |
| EP | 1441422 A2 | 7/2004 | |
| EP | 1801938 A2 | 6/2007 | |
| EP | 2584679 A2 | 10/2012 | |
| EP | 2151024 B1 | 8/2013 | |
| EP | 2642642 A2 | 9/2013 | |
| EP | 3319238 A1 | 5/2018 | |
| FR | 2613546 A1 | 10/1988 | |
| GB | 2172445 A | 9/1986 | |
| GB | 2489577 A | 10/2012 | |
| JP | 55152415 A | 11/1980 | |
| JP | 56101360 A | 8/1981 | |
| JP | 57138846 A | 8/1982 | |
| JP | 60039337 A | 3/1985 | |
| JP | 62037039 A | 2/1987 | |
| JP | S6336156 U | 3/1988 | |
| JP | 01321845 A | 12/1989 | |
| JP | 05074537 A | 3/1993 | |
| JP | 580163 U | 10/1993 | |
| JP | H614501 A | 1/1994 | |
| JP | 08054226 A | 2/1996 | |
| JP | 2009268301 A | 11/2009 | |
| JP | 2010124518 A | 6/2010 | |
| JP | 2013090425 A | 5/2013 | |
| JP | 2013174279 A | 9/2013 | |
| JP | 2016512679 A | 4/2016 | |
| SU | 1179464 A1 | 9/1985 | |
| WO | 0051511 A1 | 9/2000 | |
| WO | 0219698 A2 | 3/2002 | |
| WO | 03052902 A1 | 6/2003 | |
| WO | 2008148058 A1 | 12/2008 | |
| WO | 2008148060 A2 | 12/2008 | |
| WO | 2008148060 A3 | 5/2009 | |
| WO | 2012119832 A1 | 9/2012 | |
| WO | 2012123402 A1 | 9/2012 | |
| WO | 2014150190 A1 | 9/2014 | |

OTHER PUBLICATIONS

Japanese Laid-Open Utility Model Publication No. 2-110975, Sep. 5, 1990, 15 pages.
International Search Report and Written Opinion for PCT/US2019/054542, dated Jan. 14, 2020.
International Search Report and Written Opinion dated May 13, 2020 for International Application No. PCT/US2019/054549.
Invitation to Pay Additional Fees dated Jan. 27, 2020 for International Application No. PCT/US2019/054549.

* cited by examiner

SYSTEM AND METHOD FOR MONITORING THE STATUS OF ONE OR MORE COMPONENTS OF AN ELECTRICAL MACHINE

CROSS-REFERENCE TO RELATED APPLICATIONS

This application is a continuation of U.S. patent application Ser. No. 17/529,521, filed on Nov. 18, 2021, which is a continuation of U.S. patent application Ser. No. 16/592,269, filed on Oct. 3, 2019, now U.S. Pat. No. 11,211,757 which claims the benefit of priority under 35 U.S.C. § 119 to U.S. Provisional Application Ser. No. 62/741,152, filed on Oct. 4, 2018, the entire disclosures of which are incorporated herein by reference.

TECHNICAL FIELD

The disclosure generally relates to monitoring systems for monitoring brushes and brush holder assemblies that may be used in electrical devices and/or slip ring assemblies. More specifically, the disclosure relates to monitoring apparatus, assemblies, systems and methods of monitoring the wear of a brush in a brush holder assembly and/or the condition of a slip ring of an electrical device using a sensor.

BACKGROUND

A purpose of a brush in an electrical device is to pass electrical current from a stationary contact to a moving contact surface, or vice versa. Brushes and brush holders may be used in electrical devices such as electrical generators, electrical motors, and/or slip ring assemblies, or sliding connection applications, for example, slip ring assemblies on a rotating machine such as a rotating crane or a linear sliding connection on a monorail. Brushes in many electrical devices are blocks or other structures made of conductive material, such as graphite, carbon graphite, electrographite, metal graphite, or the like, that are adapted for contact with a conductive surface or surfaces to pass electrical current. Electrically conductive leads or shunts extend from the brush to provide an electrical pathway to and/or from the brush from another conductive member.

In some designs, a brush box type brush holder, or other type of brush holder, may be used to support a brush in contact with a moving contact surface of an electrical device during operation. The brush and brush box may be designed such that the brush can slide within the brush box to provide for continuing contact between the brush and the moving contact surface contacted by the brush. During operation an anomalous and/or threshold condition may occur, which may be indicative that one or more components of the electrical device may need to be replaced, one or more components of the electrical device may require inspection or attention, and/or maintenance may need to be performed. For example, an anomalous and/or threshold condition may indicate that one or more of a brush, brush holder, spring, shunt, commutator, collector ring, and/or other component may need to be replaced, one or more of a brush, brush holder, spring, shunt, commutator, collector ring, and/or other component may need to be inspected, and/or maintenance may need to be performed. It would be advantageous to monitor one or more components of an electrical device in order to observe the occurrence of an anomalous and/or threshold condition. Furthermore, it would be advantageous to alert an operator and/or technician of the occurrence of an anomalous and/or threshold condition and/or schedule technician intervention.

SUMMARY

The disclosure is directed to monitoring apparatus, assemblies, systems and methods of monitoring the wear of a brush in a brush holder assembly and/or the condition of a slip ring of an electrical device using a sensor.

An example system for monitoring the wear state of a carbon brush includes a brush holder assembly including a carbon brush having a first end, a second end opposite the first end, and a length measured from the first end to the second end. The length is diminished from an initial length as the first end of the carbon brush wears away during use. The brush holder assembly also includes a wear state monitor coupled to the carbon brush. The wear state monitor includes a sensor. The wear state monitor is configured to rotate as the length of the carbon brush diminishes. The sensor is configured to measure an angular displacement of the wear state monitor as the wear state monitor rotates. The measured angular displacement of the wear state monitor correlates to an amount of diminution in the length of the carbon brush.

In addition or alternatively, the brush holder assembly includes a spring having a first end and a second end, with the first end coupled to the wear state monitor. The spring is configured to provide a force urging the carbon brush into contact with a rotating conductive surface of an electrical machine.

In addition or alternatively, the wear state monitor includes a circumferential groove extending around a circumferential outer surface of the wear state monitor, and wherein the spring is disposed within the groove.

In addition or alternatively, a coiled portion of the spring is configured to wrap around a circumferential outer surface of the wear state monitor as the wear state monitor rotates.

In addition or alternatively, the brush holder assembly includes a spring having a coiled portion and an elongate portion extending from the coiled portion, wherein the wear state monitor is positioned within the coiled portion.

In addition or alternatively, the wear state monitor includes a circumferential groove extending around a circumferential outer surface of the wear state monitor, and wherein the coiled portion of the spring is disposed within the groove.

In addition or alternatively, the brush holder assembly includes a spacer positioned between the coiled portion of the spring and the second end of the carbon brush.

In addition or alternatively, the spacer includes a magnet, and the sensor is a Hall effect sensor sensing a magnetic field of the magnet.

In addition or alternatively, the spacer defines a concave cradle, wherein the coiled portion of the spring rests in the cradle.

In addition or alternatively, the wear state monitor rotates about an axis of rotation, wherein the axis of rotation is a fixed distance from the second end of the carbon brush as the wear state monitor rotates.

In addition or alternatively, the sensor is a rotary magnetic encoder.

In addition or alternatively, the sensor is configured to transmit a wireless signal to a site monitor, and wherein the wireless signal is configured to provide information relating to diminution in length of the carbon brush.

Another example system for monitoring the wear state of a carbon brush includes a brush holder coupled to a handle. The brush holder includes an opening, and a carbon brush is disposed within the opening of the brush holder. The system also includes a spring applying a force against the carbon brush to translate the carbon brush within the opening as a first end of the carbon brush wears away during use. The system further includes a wear state monitor positioned within a coiled portion of the spring, the wear state monitor configured to rotate as the first end of the carbon brush wears away.

In addition or alternatively, the system further includes a sensor disposed within a housing of the wear state monitor, wherein the sensor is configured to measure an angular displacement of the wear state monitor as the wear state monitor rotates.

In addition or alternatively, the measured angular displacement of the wear state monitor correlates to an amount the carbon brush has worn away.

In addition or alternatively, the wear state monitor rotates about an axis of rotation, wherein the axis of rotation is a fixed distance from an upper surface of the carbon brush as the wear state monitor rotates.

In addition or alternatively, the spring includes an elongate portion extending from the coiled portion of the spring along a side surface of the carbon brush.

In addition or alternatively, an end of the elongate portion of the spring is removably coupled to the brush holder.

In addition or alternatively, the wear state monitor includes a circumferential groove extending around a circumferential outer surface of the wear state monitor, and wherein the coiled portion of the spring is disposed within the groove.

In addition or alternatively, a portion of the spring is configured to wind up around a circumferential outer surface of the wear state monitor as the wear state monitor rotates.

In addition or alternatively, the wear state monitor is configured to rotate through an arc angle as the carbon brush wears away, and wherein the arc angle correlates to the amount the carbon brush wears away.

Another embodiment is a method for monitoring the wear state of a carbon brush. The method includes determining an angular displacement of a wear state monitor positioned adjacent to the carbon brush with a sensor as the wear state monitor rotates as a length of the carbon brush diminishes during use, and determining a wear state of the carbon brush based on the angular displacement of the wear state monitor.

In addition or alternatively, the method further includes comparing the wear state of the carbon brush to a threshold value.

In addition or alternatively, the method further includes communicating an indication of the wear state of the carbon brush to a user.

The above summary of some embodiments, aspects, and/or examples is not intended to describe each embodiment or every implementation of the present disclosure. The figures and the detailed description which follows more particularly exemplify these embodiments.

BRIEF DESCRIPTION OF THE DRAWINGS

The aspects of the disclosure may be more completely understood in consideration of the following detailed description of various embodiments in connection with the accompanying drawings, in which.

Figure 1:
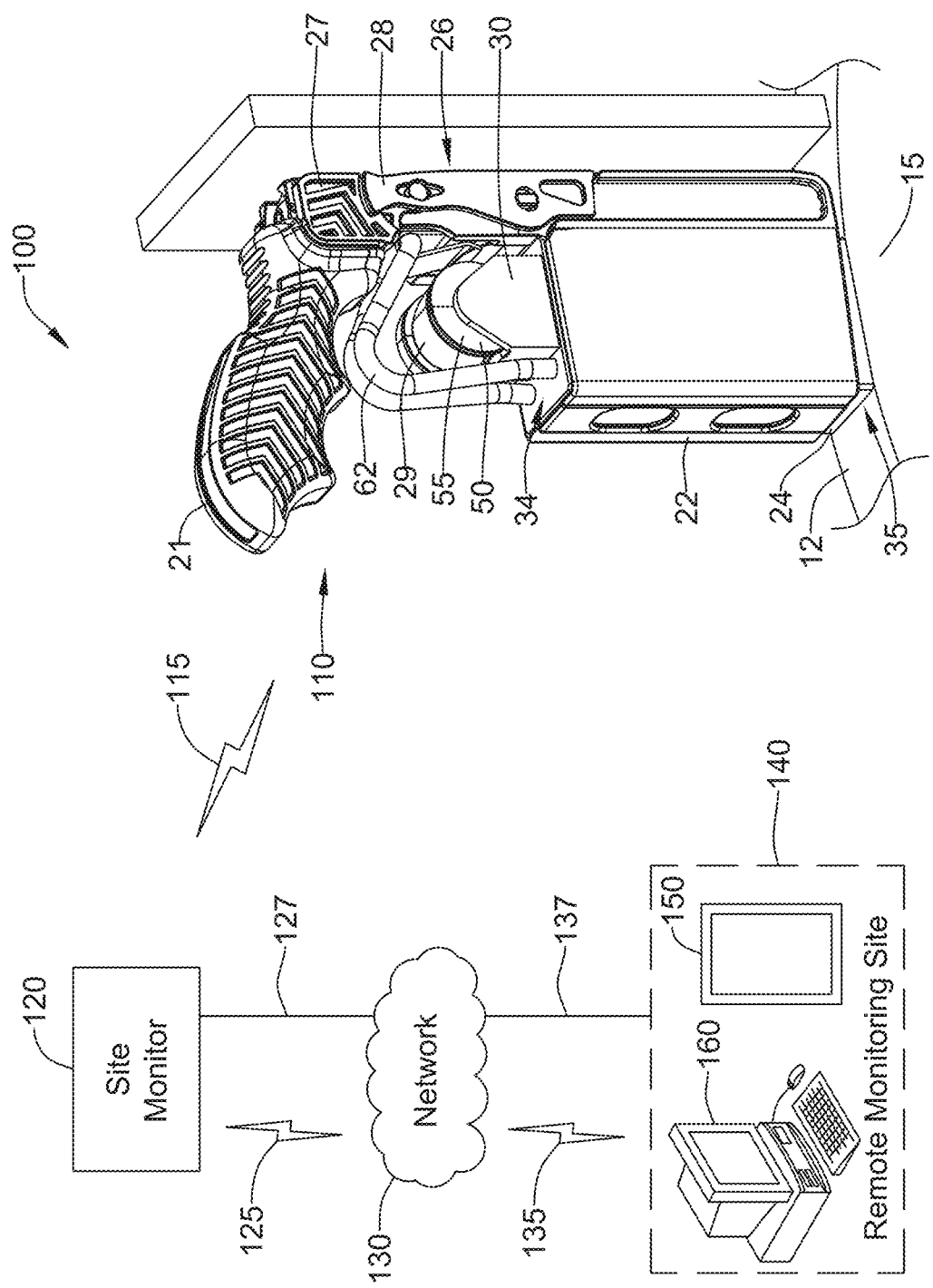
FIG. 1 shows an illustrative view of an exemplary brush monitoring system positioned adjacent a component of an electrical machine.

While the aspects of the disclosure are amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

FIG. 1 illustrates an exemplary brush monitoring system 100 that may include a brush holder assembly 110, a site monitor 120 and/or a remote monitoring site 140 including a remote monitoring device 150, 160. In some cases, the brush holder assembly 110 may substantially resemble a brush holder assembly as described in U.S. Pat. No. 7,034, 430, entitled "BRUSH HOLDER APPARATUS, BRUSH ASSEMBLY, AND METHOD", which is herein incorporated by reference in its entirety. However, the illustrative brush monitoring system 100 may be amenable to any of various brush holder assembly configurations. Thus, the intention is that the illustrative brush monitoring system 100 may be used in conjunction with any desired brush holder assembly configurations of an electrical device, such as an industrial electrical generator. For example, the illustrative brush monitoring system 100 may be used with brush holder assemblies, brush holders and/or brushes disclosed in U.S. Pat. Nos. 6,731,042; 5,753,992; 5,621,262; 5,463,264; 5,397,952; and 5,256,925; each of which is incorporated herein by reference.

FIG. 1 illustrates a brush 24 including a first end surface 34 and a second end surface 35 and a length extending therebetween. The second end surface 35 may be in electrical contact with a conductive surface 12 of a rotating component 15 of an electrical machine (e.g., a collector ring, a slip ring, or a commutator) and conduct electrical current therefrom. Further, FIG. 1 illustrates that, in some examples, one or more sides of the brush 24 may be surrounded by a brush holder 22 (e.g., a brush box), whereby the brush holder 22 may include a plurality of guiding surfaces for guiding linear or longitudinal movement of the brush 24 toward the conductive surface 12 of the rotating component 15. In other words, the brush 24 may translate linearly within an aperture defined by the plurality of guiding surfaces of the brush holder 22 as the brush 24 wears. In some embodiments it is contemplated that the brush holder 22 may not take on the form of a box, but may include one or a plurality of guiding surfaces, such as channels, posts or columns, abutting and/or encompassing one or more sides of the brush 24 and/or extending into or through the brush 24, or a portion thereof, for guiding linear or longitudinal movement of the brush 24.

FIG. 1 further illustrates that the brush holder 22 may be secured to a mounting beam 26 configured and adapted to be mounted to another structure, such as a mounting block 70. The brush holder assembly 110 may be configured to place the brush 24 in contact with the conductive surface 12, such as the surface of the rotating component 15 of the electrical machine. The brush 24 may extend from the lower edge of the brush holder 22 such that the second end surface 35 of the brush 24 engages the conductive surface 12. The mounting beam 26 may include an over-center engagement mechanism, a slotted or channeled engagement mechanism for sliding engagement, or other mechanism for easily engaging and disengaging the brush 24 from a conductive surface 12. In other embodiments, the brush holder assembly 110 may include a brush holder 22 rigidly mounted to another structure holding the brush holder 22 stationary, or mounted to another structure in any desired arrangement. For example, in some embodiments the brush holder 22 may be bolted or welded to a stationary structure. Some such brush holders are disclosed in U.S. Pat. Nos. 6,731,042; 5,753,992; 5,621, 262; 5,463,264; 5,397,952; and 5,256,925; which are incorporated herein by reference.

As shown in FIG. 1, the mounting beam 26 may include an upper beam member 27 and a lower beam member 28 hingedly or pivotedly coupled to one another. When the upper beam member 27 and the lower beam member 28 are aligned with one another (e.g., the longitudinal axis of the upper beam member 27 is parallel with the longitudinal axis of the lower beam member 28), the brush holder 22 may be considered to be in an engaged, or locked, position such that the brush 24 may be contiguous with or in contact with the conductive surface 12. When the upper beam member 27 is tilted from the lower beam member 28 (e.g., the longitudinal axis of the upper beam member 27 is oblique to the longitudinal axis of the lower beam member 28), the brush holder 22 may be considered to be in a disengaged, or unlocked, position such that the brush 24 may be non-contiguous with, spaced from, or otherwise not in direct electrical contact with the conductive surface 12. The mounting beam 26 may be removably coupled to the mounting block 70 during operation. In some embodiments, the mounting beam 26 may slidably engage with, interlock with, or otherwise be removably coupled to the mounting block 70. The mounting block 70 may be coupled to, secured to, or otherwise extend from another structure which maintains the mounting block 70 stationary with respect to (i.e., a fixed distance from) the conductive surface 12, for example.

In some embodiments, a handle 21 may be attached to the brush holder 22 to facilitate engagement and disengagement of the brush 24 from the conductive surface 12. For example, the handle 21 may be attached to the upper beam member 27 such that movement of the handle 21 actuates (e.g., pivots, slides, releases) the upper beam member 27 relative to the lower beam member 28. The handle 21 may be a removable handle or the handle 21 may be permanently attached to the upper beam member 27 or another portion of the brush holder 22.

FIG. 1 further illustrates that the brush holder assembly 110 may include a wear state monitor 50 and a spacer 30. The spacer 30 may be attached to the first end surface 34 of the brush 24. Additionally, FIG. 1 illustrates that the wear state monitor 50 may be coupled to a spring 29. In some examples, a portion of the spring 29 may be coiled around a portion of the wear state monitor 50, with an elongate portion of the spring extending from the coiled portion. Further detailed discussion of the wear state monitor 50, the spacer 30 and the spring 29 follows below.

In some examples the wear state monitor 50 may include one or more sensors which collect and/or measure a variety of parameters corresponding to the "wear state" of the brush 24. For example, the wear state monitor 50 may include one or more sensors which measure and/or communicate the extent to which the brush 24 wears away while in contact with the conductive surface 12 of the rotating component 15. In some examples, the sensor(s) may also measure the vibration and/or temperature of the brush holder assembly 110 (including individual components thereof) and/or the brush 24, and/or electrical current passing through the brush 24, for instance.

In some cases, the wear state monitor 50 may be positioned adjacent to a surface of a component of the brush holder assembly 110, different than the spring 29. For example, the wear state monitor 50 may be positioned on or adjacent to the brush holder 22, the lower beam member 28, the upper beam member 27 and/or on or adjacent to the handle 21 of the brush holder assembly 110. In some cases, the wear state monitor 50 may be permanently and/or removably incorporated into a portion of the handle 21 or other component of the brush holder assembly 110. In some examples, the wear state monitor 50 may be free from the spring 29.

As described above, in some examples the wear state monitor 50 may be mounted adjacent a surface of the spring 29 or otherwise within the spring 29, such as within a coiled portion of the spring 29. The spring 29 may include a constant force spring, which provides tension to the brush 24, the wear state monitor 50 or both the brush 24 and the wear state monitor 50 to bias the brush 24 toward and in contact with the conductive surface 12 of the rotating component 15. In other words, the spring 29 may include a coiled portion designed to provide a force to engage the brush 24 with a rotating component of an electrical machine, such as a slip ring, a commutator, and the like.

In some examples, the spring 29 may be attached to a portion of the brush holder 22 and/or the mounting beam 26 of the brush holder assembly 110. In some instances, a first end 32 of the spring 29 may be removably coupled to the brush holder and/or the mounting beam 26 with an elongate portion of the spring 29 extending along a side surface of the brush 24, between the brush 24 and the mounting beam 26. Thus, in some embodiments, an elongate portion of the spring 29 may extend along one side surface of the brush 24 between the brush 24 and the mounting beam 26 of the brush holder assembly 110 up to the coiled portion of the spring 29 positioned above the upper surface 34 of the brush 24. The opposite, second end 33 of the spring 29 may be located at the interior of the coiled portion of the spring 29.

In some cases, the wear state monitor 50 may also include one or more indicators 55 (e.g., one or more light emitting diodes (LEDs), a speaker, or a combination of LEDs and/or speakers) for communicating wear state information to a user. In some instances, the wear state monitor 50 may be capable of communicating information about the wear state of the brush 24 and/or the rotating component 15 to a user via the indicators 55. In some cases, the wear state monitor 50 may be capable of receiving messages from an external device, such as the site monitor 120 and/or a programming device located at the same site or at a remote location (e.g., a computer 150, a tablet 160, a smart phone, etc.). The messages may include commands, such as commands to send wear state information about the brush 24 and/or the rotating component 15, or commands for modifying information used by the wear state monitor 50. For example, a user may desire to modify one or more thresholds used to determine the wear state information of the brush 24 and/or the rotating component 15, and/or to reprogram the wear state monitor 50 by downloading instructions, tables and/or the like.

As described above, in some examples the wear state monitor 50 may measure and/or collect information regarding the wear state of the brush 24. In particular, the wear state monitor 50 may be designed to measure and collect information regarding the extent to which the second end surface 35 of the brush 24 contacting the conductive surface 12 has worn away (i.e., the amount of diminution in length of the brush 24 at some time from its initial length when installed in the brush holder assembly 110). It can be appreciated that as the second end surface of the brush 24 maintains contact with the rotating component 15, the second end surface 35 of the brush 24 may wear away, thereby shortening the overall length of the brush 24.

As described above, the spring 29 may apply a force to the brush 24 which is directed linearly along the aperture defined by the brush holder 22. Further, as the brush 24 decreases in length within the brush holder 22, the wear state monitor 50 may rotate within the coil of the spring 29 while the axis of rotation of the wear state monitor 50 translates linearly with linear translation of the brush 24 toward the conductive surface 12 of the rotating component 15. Additionally, a sensor may be positioned within the wear state monitor 50 and may measure and collect data representing the extent (e.g., total angular distance and/or total arc length) of rotation of the wear state monitor 50 from its initial position when the brush 24 was installed in the brush holder assembly 110, or any other duration desired. It can be appreciated that the amount of rotation measured by the sensor (positioned within the wear state monitor 50) may be equivalent, proportional, or otherwise representative of the linear or longitudinal movement of the brush 24 as it translates (e.g., shortens) within the brush holder 22, and thus equivalent, proportional, or otherwise representative of the amount of diminution of the brush 24 from its initial length.

In some cases, the sensor may associate the rotation of the wear state monitor 50 with a wear state of the brush 24 and/or a wear state of the conductive surface 12 and/or the rotating component 15. The value (e.g., amount of rotation of the wear state monitor 50) measured by the sensor may correspond to the position of the first end of the brush 24 relative to the conductive surface 12 of the rotating component 15. In some cases, the value measured by the sensor may correspond to a value obtained over any desired time interval or duration of wear of the brush 24. It can be appreciated that the value (e.g., amount of rotation of the wear state monitor 50 from its initial position) may be compared to one or more predetermined threshold values to determine a wear state of the brush 24 and/or other diagnostic information about the machine.

For example, in some cases the wear state monitor 50 (including the sensor positioned therein) may be configured to monitor a vibration of the brush 24. Vibration of the brush 24 may be due to one or more imperfections, wear or other deformation of the rotating component 15 of the electrical machine. For example, a slip ring may deform or may wear unevenly to cause one or more portions of the slip ring to be out of round. As the brush 24 encounters these defects at one or more positions during a revolution of the rotating component 15, the defects may cause the brush 24 to vibrate at a rate corresponding to the rotation speed and/or the number of defects at the conductive surface 12 of the rotating component 15 (e.g., a slip ring, a commutator, etc.). In some examples, the transient angular displacement of the wear state monitor 50 may correspond and/or correlate to a threshold change in vibration or other deformation of the rotating component 15 of the electrical machine. As used herein, "transient angular displacement" means momentary change in the rotational orientation of the wear state monitor 50 in an oscillating fashion. Therefore, in some examples, information corresponding to the transient angular displacement (which may correspond to a threshold change in vibration) of the wear state monitor 50 may be collected and transmitted to the site monitor 120 to determine if the brush 24 is experiencing excessive vibration.

Similarly, it can be appreciated that the sensor positioned within the wear state monitor 50 (or a separate temperature sensor) may measure and collect information associated with a temperature of the brush 24, other components of the electrical machine and/or the ambient air temperature surrounding the brush holder assembly 110. Further, the collected temperature values may be monitored and/or compared to one or more predetermined temperature thresholds, whereby the temperature thresholds may trigger the sensor to send a signal to the site monitor 120 indicative of the need for inspection and/or maintenance to be performed on one or more components of the electrical machine. For example, in some instances, the temperature threshold may be set to trigger a signal when the measured temperature exceeds a threshold temperature, such as a threshold temperature of 125 degrees Celsius. In other words, when the temperature sensor measures a temperature (e.g., ambient air temperature, temperature of a component of the electrical machine, etc.) greater than 125 degrees Celsius, it may send a signal to the site monitor 120 alerting personnel of the need for inspection and/or maintenance to be performed on one or more components of the electrical machine. In other instances, the threshold temperature may be set in a range of 100 degrees Celsius to 140 degrees Celsius, in a range of 110 degrees Celsius to 130 degrees Celsius, or in a range of 120 degrees Celsius to 130 degrees Celsius, for example.

In some cases, the site monitor 120 may be positioned near the electrical machine to monitor the wear state of one or more brush holder assemblies 110 and/or the wear state of the slip ring or other rotating component of the electrical machine. The site monitor 120 may be capable of monitoring the wear states of the brush 24 of the brush holder assembly 110. In some cases, the site monitor 120 may be capable of monitoring the movement of the brushes 24 of two or more brush holder assemblies 110 associated with one or more electrical machines. For example, the site monitor 120 may be communicatively coupled to one or more, or a plurality of wear state monitors 50 associated with a particular electrical machine, such as the wear state monitor 50 of the brush holder assembly 110 via a communication link 115 (e.g., a wireless link). The site monitor 120 may be configured to receive processed data and/or raw data providing information about the wear state of the brush 24 and/or the rotating component 15. For example, the site monitor 120 may receive information about a value received from the sensor corresponding to the amount of rotation of the wear state monitor 50 from its initial position at some temporal occasion after the brush 24 has been installed on the electrical machine. However, in other examples, the site monitor 120 may receive information about a value obtained by the sensor and a comparison between the value and one or more predetermined thresholds. In some cases, the communication link 115 may include a radio frequency (RF) communication link, an audio-based communication link (e.g., an ultrasonic communication link), and/or an optical communication link (e.g., an infrared (IR) communication link, a visible light communication link, etc.). In some cases, the site monitor 120 may be configured to predict or determine an estimated projection of a condition of the brush 24 into the future.

In some examples, the wear state monitor 50 may be configured to communicate the wear state information about the brush 24 to the site monitor 120 using a predetermined schedule (e.g., once per hour or hourly, once per day or daily, once per week or weekly, twice per week, etc.). In some examples, the wear state monitor 50 may provide the wear state information about the brush 24 and/or the rotating component 15 of the electrical machine to the site monitor 120 in response to a command received from the site monitor 120 and/or the remote monitoring device 150, 160. Additionally, the site monitor 120 may be programmed to receive wear state information about the brush 24 at predetermined intervals. In some cases, the predetermined intervals may be fixed at a particular value (e.g., once per hour or hourly, once per day or daily, once per week or weekly, twice per week, etc.) and in other cases, the intervals may change after a particular wear state has been reached. For example, the site monitor 120 may be configured to receive wear state information from the wear state monitor 50 at a first time interval, such as once per day, until one or more brushes 24 and/or the rotating component 15 reach a wear state approaching the replacement wear state. At that point, the wear state monitor 50 may sample the wear state information from the brush 24 at a second shorter time interval, such as hourly. Thus, the wear state information from the wear state monitor 50 may be communicated to the site monitor 120 at first frequency until the brush 24 reaches a first wear state, and thereafter, the wear state information may be communicated to the site monitor 120 at a second frequency greater than the first frequency.

The site monitor 120 may output an indication of the condition and/or projected condition of the brush 24. In some cases, the indication may be configured to alert operator, technician and/or other personnel that the brush 24 and/or the rotating component 15 are sufficiently worn and/or needs to be replaced, the brush 24 and/or the rotating component 15 are damaged, failure has occurred or is imminent, or other maintenance or inspection may need to be performed. In some embodiments, the indication may be used for scheduling maintenance or inspection, sending personnel to perform maintenance or inspection, ordering and/or scheduling distribution/delivery of a replacement brush or other part, routing maintenance personnel and/or product delivery to a specified location, or arranging for other notification and/or scheduling tasks be performed.

The brush monitoring system 100 may also be used to identify and/or notify other key maintenance, failure of the brush holder assembly 110 and/or other anomalous conditions. For example, incidents of excess heating, arcing or excess vibration, which may indicate a need to perform maintenance and/or disrupt operation of the electrical equipment, may be identified and/or assessed by one or more components of the brush monitoring system 100. The wear state monitor 50, the site monitor 120 and/or the remote monitoring device 150, 160 may carry out an appropriate response to respond to an identified anomalous condition in an attempt to rectify the anomalous condition. In some cases, an operator may carry out an appropriate response to respond to an anomalous condition identified with the brush monitoring system 100 in an attempt to rectify the anomalous condition.

In some cases, the site monitor 120 may be communicatively coupled by a wireless link 125 and/or wired link 127 to a network 130. The site monitor 120 may be capable of communicating information about the wear state of one or more brushes 24 to a remote monitoring device 150, 160 at a remote monitoring site 140 via the network 130 and one or more wired 137 and/or wireless 135 communication links. The wired link 127, 137 and/or wireless link 125, 135 communication links may be configured to operate using one or more standardized communication protocols (e.g., Ethernet, Ethernet/IP, BACnet, Modbus, LonWorks, etc.), or proprietary communication protocols. Examples of a remote monitoring system are described in U.S. Pat. No. 7,705,744, entitled "MONITORING SYSTEMS AND METHODS FOR MONITORING THE CONDITION OF ONE OR MORE COMPONENTS OF AN ELECTRICAL DEVICE", U.S. Pat. No. 8,618,943, entitled "BRUSH HOLDER ASSEMBLY MONITORING APPARATUS, ASSEMBLY, SYSTEM AND METHOD", and U.S. Pat. No. 9,252,643, entitled "SYSTEM AND METHOD FOR MONITORING THE STATUS OF ONE OR MORE COMPONENTS OF AN ELECTRICAL MACHINE", which are herein incorporated by reference in their entirety. The remote monitoring site 140 may include one or more remote monitors, such as a personal computer 160, a workstation, a laptop, a tablet 150, a smart phone or the like, for collecting data and/or analyzing data received from one or more user sites.

The remote monitoring devices and/or site monitor 120 may be integrated into a maintenance program for a brush holder assembly 110, such that the site monitor 120 may be configured to monitor at least a condition of one or more components of the brush holder assembly 110. To do so, the remote monitors and/or the site monitor 120 may be configured to identify each brush holder assembly 110 on a particular machine or at a particular site and/or store an installation date and any servicing dates for each brush holder assembly 110 and/or components thereof, such as the installation date of a brush 24 in the brush holder assembly 110. In some examples, the wear state monitor 50 (or other sensor of the brush holder assembly 110) may output a signal to the site monitor 120 indicating that a brush 24 or other component of the electrical machine has been removed and/or replaced, and/or an indication that a new brush 24 has been installed. Component replacement information may be collected and monitored by the wear state monitor 50, one or more sensors of the brush assembly 110 and/or the site monitor 120.

In some cases, one or more parameters received from the wear state monitor 50 associated with a brush holder assembly 110 may be monitored over time to determine trending information about a brush 24 and/or a rotating component 15 of the electrical machine. For example, the site monitor 120 and/or the remote monitors may determine trend information, that may include an average lifetime for a brush 24 installed in a particular brush holder assembly 110 and/or for a particular installation position on an electrical machine. The site monitor 120 and/or the remote monitors may be configured to store information about the position of a brush 24 when the brush 24 and/or brush holder assembly 110 is first installed on an electrical machine. By monitoring the final position and/or replacement date of a brush 24 along with the initial position and/or installation date each time a brush 24 is replaced and a new brush 24 is installed in the brush holder assembly 110, information may be gathered about a wear state of the rotating component 15. For example, a slip ring, or other rotating component of the electrical machine, may have an initial outer diameter measurement. Over time, with wear including normal wear and/or due to environmental conditions (e.g., humidity, temperature, contaminants including abrasives, etc.) a wear state associated with the thickness and/or outer diameter of the rotating component 15 may be measured and/or predicted. In some cases, preventative measures to improve the lifetime of the brush 24 and/or the rotating component 15 may be obtained by analysis of the information received from the one or more wear state monitors 50. For example, a user may be advised to adjust one or more environmental conditions for a space near the electrical machine, such as a temperature, a humidity level and/or a contaminant level.

Figure 2:
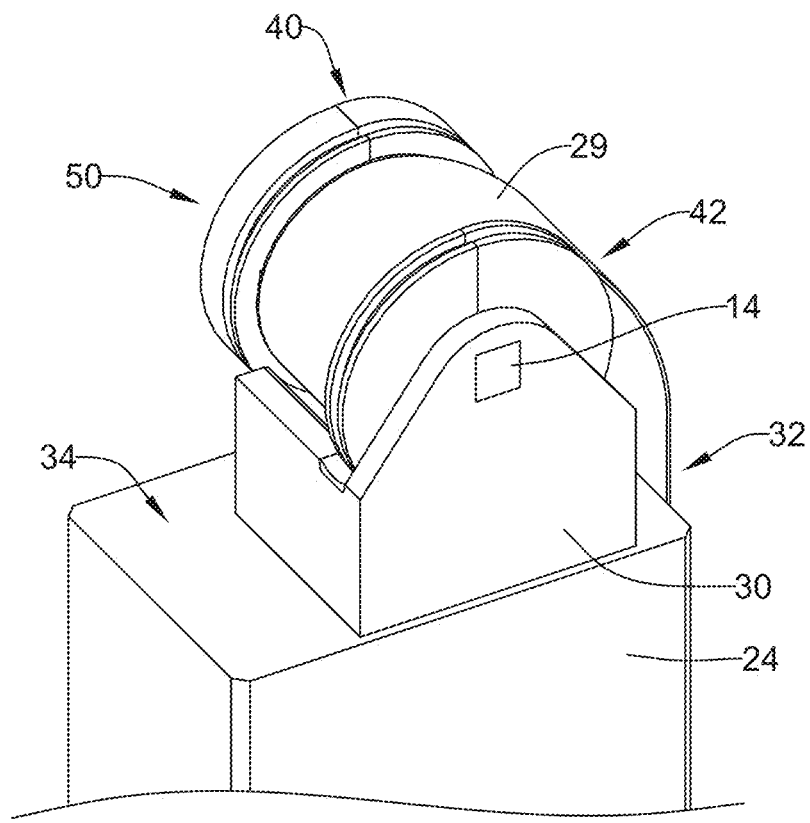
FIG. 2 shows an example wear state monitor and spring positioned adjacent a spacer on a brush.
Figure 3:
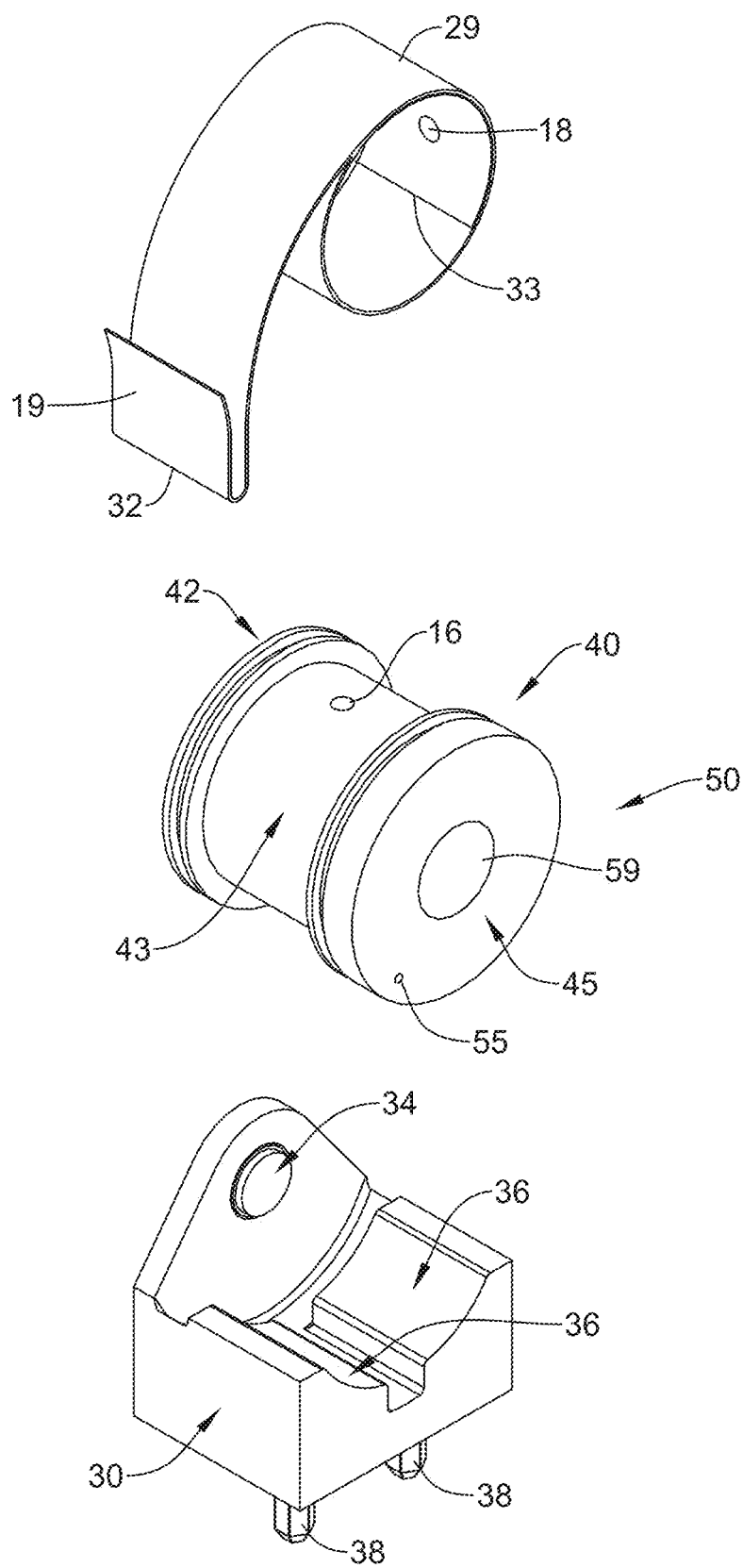
FIG. 3 shows an exploded view of the brush holder assembly components shown in FIG. 2.

FIG. 2 illustrates the wear state monitor 50, spring 29 and spacer 30 shown in FIG. 1, positioned above an upper surface of a carbon brush 24. FIG. 3 illustrates an exploded perspective view of the wear state monitor 50, spring 29 and spacer 30 as described above in FIG. 2. For clarity, FIG. 3 illustrates the wear state monitor 50, spring 29 and spacer 30 after having been rotated 180 degrees as compared with their orientation depicted in FIG. 1 and FIG. 2.

As illustrated in FIG. 2 in some examples the wear state monitor 50 and spring 29 may be nested within the spacer 30, such as within a concave cradle of the spacer 30. The spacer 30 may be positioned between the coiled portion of the spring 29 and the upper or first end surface 34 of the carbon brush 24. In some instances, the spacer 30 may be attached to the first end surface 34 of the brush 24 such that the spacer 30 moves with the brush 24. For example, as shown in FIG. 3, the spacer 30 may include one or more projections, such as pin members 38, designed to engage bores extending into the brush 24 from the first end surface 34 (shown in FIG. 1) of the brush 24. For example, each of the pin members 38 may be designed to extend into a corresponding bore located within the first end surface 34 of the brush 24. It can be appreciated that engagement of the pin members 38 within their respective bore functions to secure the spacer 30 to the brush 24. In other instances, the spacer 30 may include a different engagement feature configured to mate with a complementary engagement feature in the first end surface 34 of the brush. For example, the spacer 30 may include one or more rails configured to extend into corresponding channels formed in the first end surface 34 of the brush 24.

The wear state monitor 50 may include a first end region 40, a second end region 42 and a medial region 43 (see FIG. 4) extending therebetween. The medial region 43 may be generally cylindrical, or other such shape designed to facilitate integration into a brush holder assembly 110 or other mounting location within the brush holder assembly 110. In some instances, the medial region 43 may have a cylindrical circumferential surface. Each of the first end region 40 and the second end region 42 may extend radially outward from the circumferential surface of the medial region 43, thereby creating a groove or recessed area (further illustrated in FIG. 4) in which the coiled portion of the spring 29 may be positioned between the first end region 40 and the second end region 42.

As discussed above, the medial portion 43 of the wear state monitor 50 may be designed to be captured within the coiled portion of the spring 29. In other words, a portion of the spring 29 (i.e., the coiled portion) may be coiled (e.g., wrapped) around the medial region 43 of the wear state monitor 50. As shown in FIG. 2, the first end region 40 and the second end region 42 may provide a shoulder on opposing sides of the coiled portion of the spring 29 to ensure that the spring 29 does not slip out of the groove defined between the first end region 40 and the second end region 42. It can be appreciated that the first end region 40 and/or the second end region 42 may be removable, or otherwise configurable, to allow the wear state monitor 50 to be mounted within a coiled portion of different sized springs. For example, the removable and/or configurable first end region 40 and/or second end region 42, may allow the wear state monitor 50 to be mounted within a coiled portion of a spring having a first width and a first coil diameter and/or a spring having a second different width and/or a second different coil diameter.

As discussed above, a sensor may be positioned within the wear state monitor 50 and may measure and collect data representing a current rotational position of the wear state monitor 50 which can be used to determine the extent (e.g., total angular distance and/or total arc length) of rotation of the wear state monitor 50 from its initial position whereby the amount of rotation measured by the sensor (positioned within the wear state monitor 50) may be equivalent, proportional, or otherwise representative of the linear or longitudinal movement of the brush 24 (shown in FIG. 1) as it translates (e.g., shortens) within the brush holder 22 (shown in FIG. 1). In particular, the sensor positioned within the wear state monitor 50 may be designed to detect the absolute angular position of the sensor relative to a permanent magnet positioned adjacent the sensor. For example, FIG. 2 illustrates a magnet 14 attached to the spacer 30, or otherwise incorporated with the spacer 30. While FIG. 2 illustrates the magnet 14 approximately aligned with the central axis of the wear state monitor 50, it is contemplated that the magnet 14 may be positioned along other portions of the wear state monitor 50 and/or along other elements of the brush holder assembly 110. FIG. 3 illustrates that, in some examples, the medial region 43 of the wear state monitor 50 may include an engagement feature such as a tab, shoulder or an opening, (not shown in FIG. 2) which may be used to facilitate a connection with or engagement with the second end 33 of the spring 29 located on the interior of the coiled portion of the spring 29. For example, FIG. 3 illustrates a boss (e.g., protrusion) 16 extending away from the outer surface of the medial region 43. The boss 14 may have a shape configured to mate with a corresponding opening 18 of the spring 29 proximate the second end 33 of the spring 29. The opening 18 may have a shape corresponding to a cross-sectional shape of the boss 16. For example, the boss 16 may have a circular cross-sectional shape designed to mate with a circular shape of the opening 18. However, while FIG. 3 illustrates the boss 16 and the opening 18 having a circular shape, other shapes are contemplated. For example, the boss 16 and the opening 18 may include square, ovular, rectangular, star, triangular, or any other geometric shape. It can be appreciated that engagement of the boss 16 with the opening 18 may rotationally fix the wear state monitor 50 with the coiled portion of the spring 29 such that rotational movement (e.g., coiling) of the coiled portion of the spring 29 correspondingly rotates the wear state monitor 50 an equal amount.

In other embodiments, the outer surface of the medial region 43 may include a shoulder or raised edge configured to engage the second end 33 of the spring 29 when the coiled portion of the spring 29 is coiled around the medial region 43. In some instances, the second end 33 of the spring 29 may be trapped underneath the layers of the coiled spring 29 wound thereover, which may apply a radially inward compressive force on the second end 33 of the spring 29 to maintain the second end 33 of the spring 29 against the surface of the medial region 43, ensuring the second end 33 of the spring 29 remains rigidly fixed to the wear state monitor 50.

FIG. 3 further illustrates that the first end of the spring 32 may be folded back on itself to form a tab, wherein the tab is designed to be removably coupled to the brush holder and/or the mounting beam 26 (shown in FIG. 1). In other words, the tab 19 may be designed to engaged (e.g., be inserted into) a portion of the brush holder and/or the mounting beam 26.

As illustrated in FIG. 3, the spacer 30 may include one or more arcuate surfaces 36 defining a concave cradle designed to mate with the circumferential profile of the wear state monitor 50. In other words, the spacer 30 may include one or more concave surfaces 36 having a radius of curvature that substantially matches the radius of curvature of the outer surface of the wear state monitor 50. Thus, a portion of the wear state monitor 50 may be positioned in the concave cradle of the spacer 30. The spacer 30 may be positioned between the coiled portion of the spring 29 and the upper surface of the brush 24 to space the coiled portion of the spring 29 away from the brush 24.

Additionally, FIG. 3 illustrates that the spacer 30 may include a projection 34 designed to engage the second end region 42 of the wear state monitor 50. It can be appreciated that the second end region 42 may include a recess (not shown) which is designed to mate with the projection 34 and permit rotational movement of the wear state monitor 50 about a rotational axis aligned with the central axis of the projection 34. The engagement of the projection 34 within the recess of the second end portion may provide additional securement between the wear state monitor 50 and the spacer 30 while permitting rotational movement therebetween. Thus, it can be appreciated the projection 34 may cooperate with the arcuate surfaces 36 of the concave cradle to permit the wear state monitor 50 to rotate (as described above) when engaged with the spacer 30.

Figure 4:
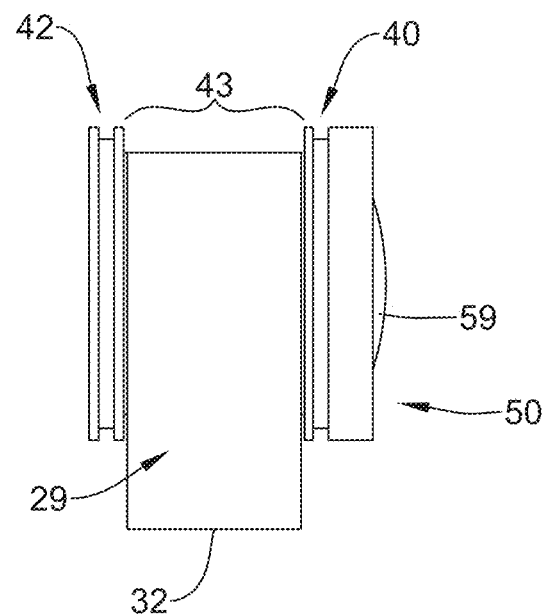
FIG. 4 shows an end view of the wear state monitor and spring shown in FIG. 4.

FIG. 4 illustrates an end view of the wear state monitor 50 including the first end region 40, the second end region 42 and the medial region 43 extending therebetween. As discussed above, FIG. 4 illustrates the outer peripheral surfaces of both the first end region 40 and the second end region 42 extending radially outward beyond the cylindrical circumferential surface of the medial region 43. As described above, the inner surfaces of each of the first end region 40, the second end region 42 and the circumferential surface of medial region 43 may define a groove in which the spring 29 may be positioned, with the inner surfaces of the first and second end regions 40, 42 forming shoulders.

Figure 5:
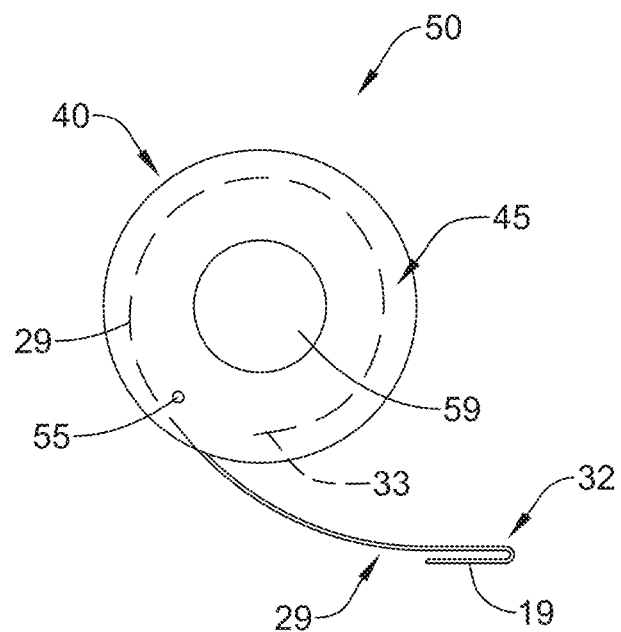
FIG. 5 shows a side view of the wear state monitor and spring shown in FIG. 4.

FIG. 5 shows a side view of the wear state monitor 50 and the spring 29 described above. FIG. 5 illustrates that spring 29 may include an elongate portion extending away from the wear state monitor 50 whereby the first end 32 of the spring 29 extends past the outer circumferential surface of the wear state monitor 50. As noted above, the first end 32 of the spring 29 (including tab 19 described above) may be removably coupled to the brush holder and/or the mounting beam 26 with the elongate portion of the spring 29 extending along a side surface of the brush 24, between the brush 24 and the mounting beam 26. Additionally, FIG. 5 illustrates spring 29 wrapping around the medial region 43 of the wear state monitor 50. For example, the dashed line represents the spring 29 wrapping around the medial region 43 of the wear state monitor 50, whereby the second end 33 of the spring 29 is coupled to or otherwise in contact with the wear state monitor 50, such as via the boss 16 and opening 18 connection, as described above with respect to FIG. 3.

Figure 6:
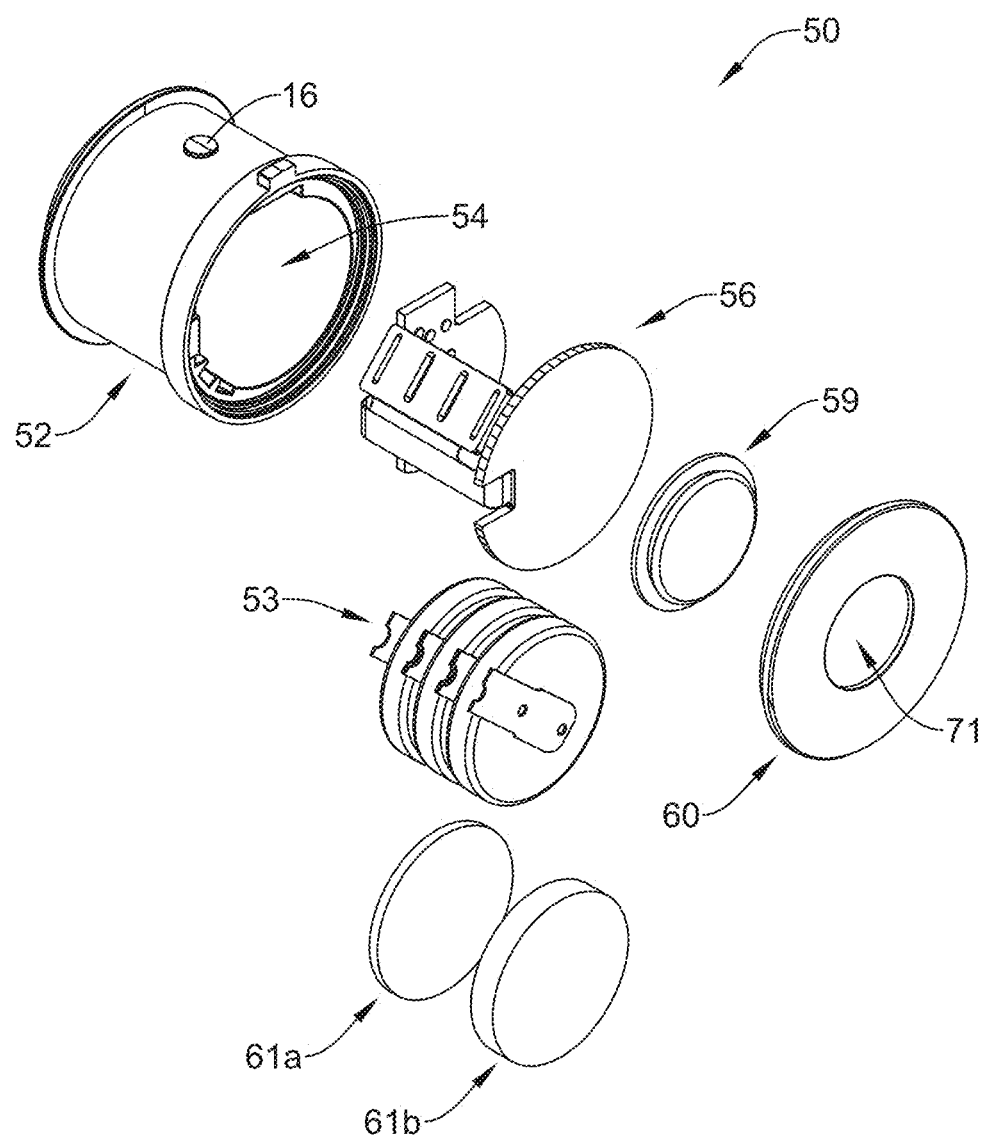
FIG. 6 shows an exploded view of the wear state monitor shown in FIG. 4.

FIG. 6 illustrates an exploded view of the wear state monitor 50 described above. As illustrated in FIG. 6, the wear state monitor 50 may include an exterior housing 52. The exterior housing 52 may include an inner cavity 54. The cavity 54 may be configured to contain one or more internal components of the wear state monitor 50. The wear state monitor 50 may also include a housing lid 60 configured to mate with the exterior housing 52. In other words, the lid 60 may be designed to be rigidly attached to the exterior housing 52. In other instances, the exterior housing 52 may be adhesively bonded or snap fit to the lid 60 to secure the exterior housing 52 and the lid 60 together. Further, the lid 60 may include an aperture 71 extending through the entire wall thickness of the lid 60.

Additionally, the wear state monitor 50 may include a button 59. In some instances, the button 59 may be a Viton button. The button 59 may be utilized to pair the wear state monitor 50 to another device via a Bluetooth connection, for example. Further, it can be appreciated that a portion of the button 59 may be designed to project through the aperture 71 of the lid 60, thereby making the button 59 accessible to depress and pair the wear state monitor 50 to another device via a Bluetooth connection. When the exterior housing 52 is engaged with the lid 60 and the button 59, the cavity 54 created by the combination of the exterior housing 52, the lid 60 and the button 59 may be sealed to the outside environment.

In other instances, the housing 52 may include a first housing section and a second housing section separable from one another to expose an interior cavity of the wear state monitor 50 housing the internal components of the wear state monitor 50. In some instances, the first housing section and the second housing section may be hingedly connected (e.g., connected in a "clam shell" configuration), or otherwise movable relative to one another. In such cases, when the wear state monitor 50 is located within the coiled portion of the spring 29 (e.g., a helical spring), the force provided by the spring 29 may facilitate a compression connection or snap fit connection for engaging the first housing section with the second housing section of the wear state monitor 50. In other instances, the first housing section may be adhesively bonded or snap fit to the second housing section to secure the first and second housing sections together.

FIG. 6 further illustrates that the wear state monitor 50 may further include a power source 53 (e.g., one or more batteries, capacitors, or both) and a sensor 56 (it is noted that the sensor 56 may correspond to the sensor described above with respect to FIG. 1). The power source 53 may be rechargeable and/or replaceable.

In some instances, the sensor 56 may be referred to as an angular sensor 56 and/or a magnetic encoder 56. As discussed above, the sensor 56 may produce a signal corresponding to the rotation (e.g., the absolute angular position) of the wear state monitor 50 relative to the stationary magnet 14 described above with respect to FIG. 2. For example, the sensor 56 may be able to sense a change in the magnetic field created by the magnet 14, thus determining a rotational orientation of the wear state monitor 50. The signals provided by the sensor 56 corresponding to the rotational orientation of the wear state monitor 50 may be compared to determine an angular displacement of the wear state monitor 50 between two temporal occasions, such as between an angular position of the wear state monitor 50 when the brush 24 is installed in the brush holder assembly 110 and some later time when the brush 24 has worn. These signals (corresponding to the angular displacement and/or rotational orientation of the wear state monitor 50) may be communicated to the site monitor 120 via a variety of communication methods. In some instances, the sensor 56 may additionally include an accelerometer configured to sense dynamic vibration of the brush 24 in the brush holder 22. For example, the sensor 56, in addition to sensing angular displacement and/or rotational orientation of the wear state monitor 50, may sense transient angular displacement of the wear state monitor 50 corresponding to dynamic vibration of the brush 24.

Additionally, in some cases, the power source 53 and/or sensor 56 may be located within the cavity 54 of the wear state monitor 50, such that the power source 53 and/or the sensor 56 may be integrated with the wear state monitor 50. Further, it can be appreciated that when the exterior housing 52 is engaged with the lid 60 and the second button member 59, both the power source 53 and the sensor 56 may be sealed within the cavity 54 formed by the combination of the exterior housing 52, the lid 60 and the second button member 59.

Additionally, FIG. 6 illustrates that the wear state monitor 50 may include a first foam insulation member 61a and a second foam insulation member 61b. In some instances, each of the first foam insulation member 61a and the second foam insulation member 61b may be formed from silicone. Other materials may be utilized to form the first foam insulation member 61a and/or the second foam insulation member 61b. Further, the first foam insulation member 61a and the second foam insulation member 61b may be utilized to insulate the power supply 53 when positioned within the cavity 54. In other words, when positioned inside the cavity 54, the power supply 53 may be disposed between the first foam insulation member 61a and the second foam insulation member 61b.

The power source 53 of the wear state monitor 50 may be used to supply power to one or more components of the wear state monitor 50, such as the sensor 56, to facilitate the measurement and generation of a value representative of the angular displacement or rotation of the wear state monitor 50 (which is proportional to the diminution in length of the brush 24 during use, as described above). In other words, as the wear state monitor 50 rotates in response to the diminution in length of the brush 24 as the brush 24 wears, the sensor 56 may sense, measure and collect the information (e.g., data) of the amount of rotation or angular displacement of the wear state monitor 50, which is proportional to or otherwise correlates to the amount of diminution in length of the brush 24. The wear state monitor 50 rotates about an axis of rotation passing through the center of the wear state monitor 50. The axis of rotation is a fixed distance from the second end 34 of the carbon brush 24 as the wear state monitor 50 rotates, and thus the axis of rotation translates with the brush 24 as the brush 24 wears and diminishes in length.

For example, in some instances, the sensor 56 may obtain values corresponding to a first position of the brush 24, at a first temporal occasion $T_0$, such as an initial position of the brush 24 when the brush 24 has been placed on the electrical device and having approximately no wear. In other words, the sensor 56 may be used to sense the angular position of the wear state monitor 50 at the initial temporal occasion $T_0$. The sensor 56 may obtain values corresponding to a position of the brush 24 at a later temporal occasion $T_1$ after the brush has been worn a first amount. In other words, the sensor 56 may be used to sense the angular position of the wear state monitor 50 at the temporal occasion $T_1$. The sensor 56 may obtain additional values corresponding to a further position of the brush 24 at later temporal occasions $T_2$, $T_3$, $T_4$, etc. after the brush has been worn an additional amount. In other words, the sensor 56 may be used to sense the angular position of the wear state monitor 50 at the further temporal occasions $T_2$, $T_3$, $T_4$, etc. The angular displacement of the wear state monitor 50 between each temporal occasion may be used to determine the diminution in length of the brush 24, and thus the current wear state of the brush 24 and/or project when the brush 24 will diminish in length to a threshold amount at a future time. In some instances, the threshold amount may correspond to a brush length approximating when the brush 24 has a predetermined amount of wear (e.g., approaching the replacement threshold, maximum allowable wear, etc.).

Additionally, in some cases, the sensor 56 may be configured to sense a first threshold value corresponding to a first wear state of the brush 24 and a second threshold value different from the first threshold value corresponding to a second wear state of the brush 24. For example, the first threshold value may include the total rotation amount or angular displacement of the wear state monitor 50 indicative of a wear state where the brush 24 should be replaced within a predetermined time period (e.g., within a week). The second threshold value may correspond to a total rotation amount or angular displacement of the wear state monitor 50 indicative of a wear state requiring the brush 24 to be replaced as soon as possible.

Figure 7:
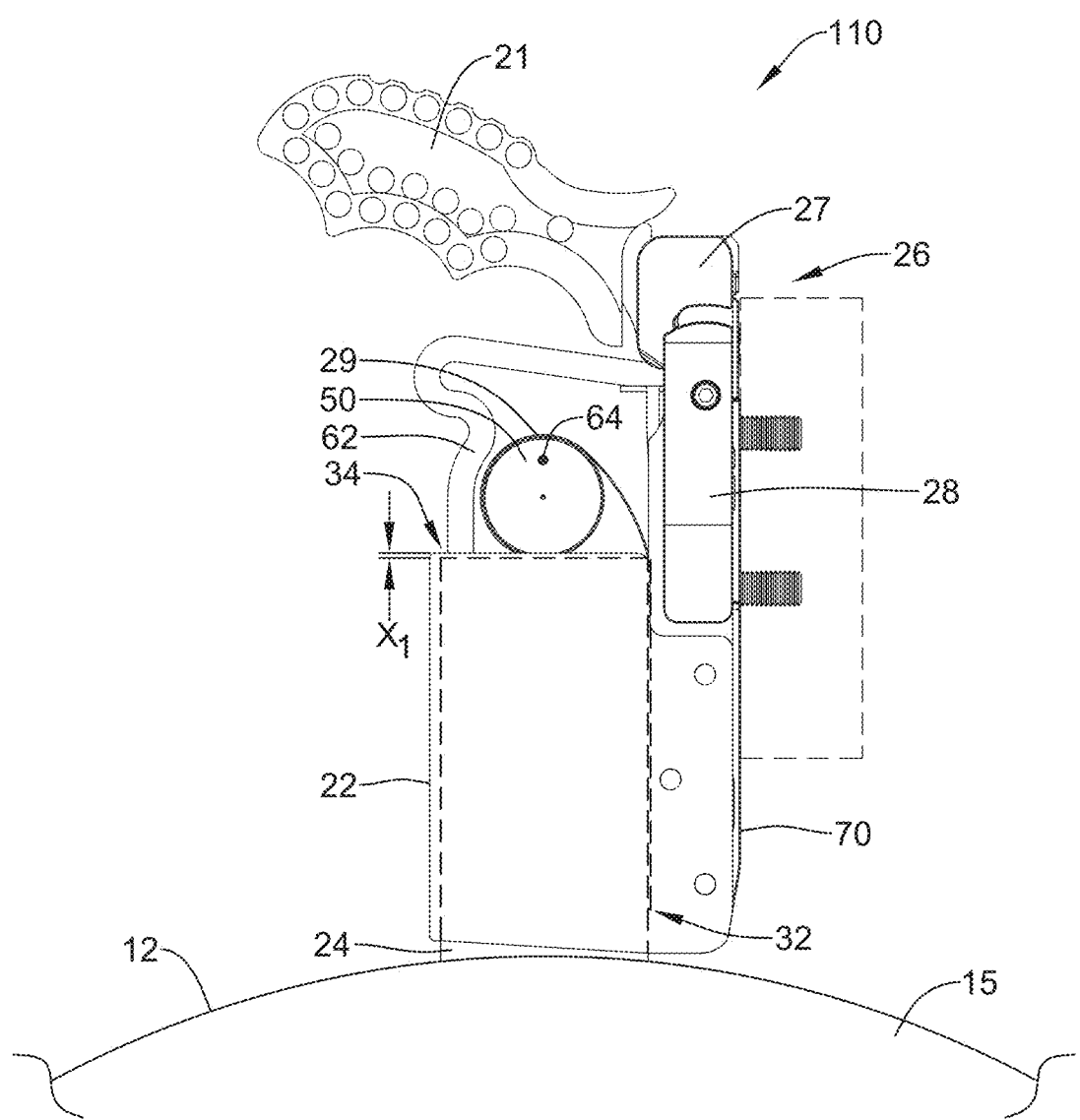
FIGS. 7 and 8 show side views of an illustrative brush holder assembly at a first wear state and a second wear state.
Figure 8:
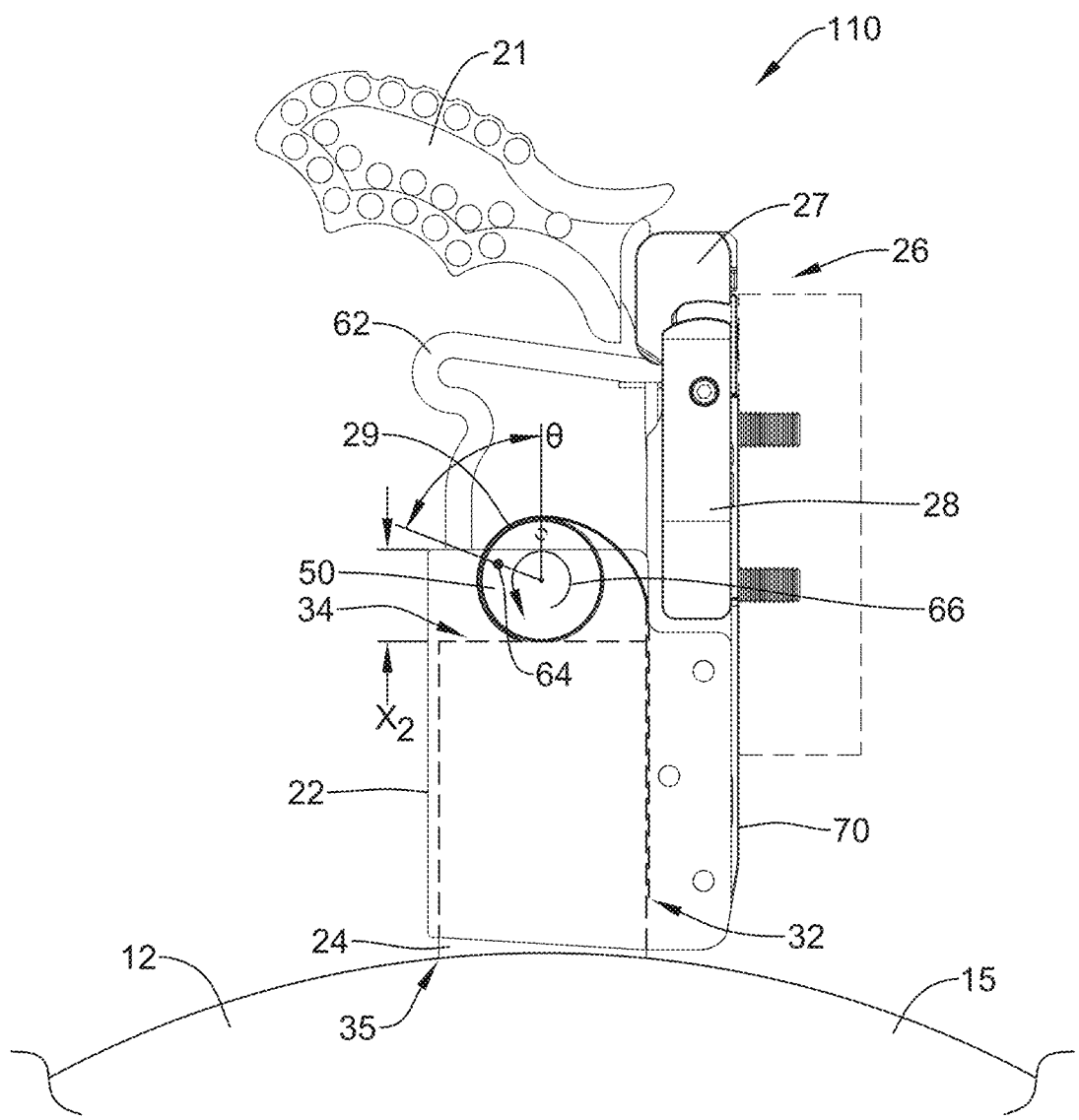

FIGS. 7 and 8 illustrate side views of the brush holder assembly 110 shown in FIG. 1, at different temporal occasions representing different identifiable wear states of the brush 24. For simplicity purposes, the spacer 30 (shown in FIG. 1) has been removed from FIGS. 7 and 8. Additionally, FIGS. 7 and 8 illustrate the brush holder assembly 110 including the brush holder 22 secured to the mounting beam 26, whereby the mounting beam 26 is configured to be removably mounted to the mounting block 70. Further, FIGS. 7 and 8 show the mounting beam 26 including the upper beam member 27 and the lower beam member 28 pivotally coupled to one another in the engaged position, as described above with respective to FIG. 1. FIG. 7 and FIG. 8 further illustrate the brush holder assembly 110 including a handle 21 and the conductive wires 62 attached to both the brush 24 and extending therefrom.

As discussed above and illustrated in FIGS. 7 and 8, an end region of the spring 29 may be coiled around a portion (e.g., the medial region) of the wear state monitor 50 while the elongate portion of the spring 29 extends along a side surface of the brush 24 with the first end 32 of the spring 29 coupled to the mounting beam 26. Further, while not visible in FIGS. 7 and 8, a sensor and/or power supply may be positioned within an interior space (e.g., a cavity) within the wear state monitor 50 (as described above).

FIG. 7 illustrates a first configuration (e.g., an initial wear state) of the brush 24 at an initial temporal occasion $T_0$, such as when the brush 24 of the brush holder assembly 110 is first installed on an electrical machine. FIG. 7 illustrates the brush 24 positioned within the brush holder 22 (as described above with respect to FIG. 1), with the lower surface of the brush 24 engaged with the conductive surface 12 of the rotating component 15. Additionally, FIG. 7 shows that the first end surface 34 of the brush 24 is positioned a distance $X_1$ from the end of the brush holder 22 nearest the handle 21 at an initial position at the initial temporal occasion $T_0$. It can be appreciated that when the brush holder assembly 110 is in an engaged position, the spring 29 may apply a force to the first end surface 34 of the brush 24 to engage the brush 24 with the conductive surface 12 of the rotating component 15.

For illustrative purposes, FIG. 7 includes a "rotation marker" 64 placed on the wear state monitor 50. For simplicity, the rotation marker 64 has been placed on the wear state monitor 50 at approximately the "twelve o'clock" position, but could be placed at any desired location. The rotation marker 64 need not be a visual marker, although it is possible to include a visual marker. The rotation marker 64 may be representative of a positional signal provided by the sensor 56 of a rotational orientation of the wear state monitor 50.

FIG. 8 illustrates a second configuration (e.g., a second wear state) of the brush 24 at a later temporal occasion $T_1$, such as after the brush 24 has engaged the conductive surface 12 of the rotating component 15 over a period of time and diminished in length. As described above, the spring 29 may continue to exert a force on the first end surface 34 of the brush 24 as the brush 24 wears away against the conductive surface 12 of the rotating component 15. For example, FIG. 8 illustrates the first end surface 34 of the brush 24 positioned a distance $X_2$ from end of the brush holder 22 nearest the handle. It can be appreciated that the difference between distance "$X_2$" and distance "$X_1$" shown in FIG. 7, represents the amount of diminution in length of the brush 24 (i.e., how much the brush 24 has shortened in length).

Additionally, as described above, as the brush 24 translates within the brush holder 22, the wear state monitor 50 may rotate in proportion to the length of shortening of the brush 24. The rotation or angular displacement θ of the wear state monitor 50 between the initial rotational position of the wear state monitor 50 at $T_0$ and the rotational position of the wear state monitor 50 at $T_1$ is illustrated in FIG. 8. Additionally, FIG. 8 shows the rotation position marker 64 in a second position, further representing the rotation or angular displacement of the wear state monitor 50. It is noted that the rotational axis of the wear state monitor 50 remains at a fixed distance from the upper surface of the brush 24 throughout the wear of the brush 24.

As described above, as the wear state monitor 50 rotates in response to the shortening of the brush 24 (e.g., the wearing of the second end surface 35 of the brush 24), the sensor 56 may measure and collect information relating to the rotation or angular displacement of the wear state monitor 50. Further, this information relating to the rotation or angular displacement of the wear state monitor 50 may be analyzed to determine an amount of diminution in length of the brush 24, a current wear state of the brush 24, a wear rate of the brush 24, and/or predict a future wear state of the brush 24 at a future time. Such information and/or data regarding the state of the brush 24 may be communicated to the site monitoring device 120 and/or a remote monitoring device 140. The remote monitoring device 140 may be located at the same and/or at a different geographical location from the geographical location of the electrical machine and the site monitoring device 120.

In some cases, the wear state monitor 50, the site monitor 120 and/or the remote monitoring device 140 may include a processor capable of processing instructions for predicting a life expectancy of the brush 24 and/or the rotating component 15 of the electrical machine. In some cases, the processor may be capable of processing instructions for identifying the wear state of the carbon brush and/or identifying the wear state of the rotating electrical component (e.g., a slip ring, a commutator, etc.) of the electrical device.

Those skilled in the art will recognize that aspects of the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A system for monitoring the wear state of a carbon brush, comprising:
    a carbon brush having an upper surface, a lower surface opposite the upper surface, and a length measured from the upper surface to the lower surface, wherein the length is diminished from an initial length as the lower surface of the carbon brush wears away during use;
    a spring having a coiled portion and an elongate portion extending from the coiled portion, wherein the spring is configured to provide a force urging the lower surface of the carbon brush into contact with a rotating conductive surface of an electrical machine;
    a spacer coupled to the upper surface of the carbon brush, the spacer positioned between the coiled portion of the spring and the upper surface of the carbon brush; and
    a wear state monitor including a sensor, wherein the sensor is configured to measure an amount of diminution in the length of the carbon brush from its initial length as the lower surface of the carbon brush wears away during use;
    wherein the wear state monitor is configured to detect an angular position of the sensor to a magnet.

2. The system of claim 1, wherein the spacer includes an engagement feature configured to mate with a complementary engagement feature in the upper surface of the carbon brush.

3. The system of claim 1, wherein the spacer includes a pin configured to extend into a bore located within the upper surface of the carbon brush.

4. The system of claim 1, wherein the sensor measures an angular displacement of the coiled portion of the spring.

5. The system of claim 1, wherein the sensor is positioned within the coiled portion of the spring.

6. The system of claim 1, wherein the sensor is configured to sense a change in a magnetic field created by the magnet.

7. The system of claim 1, wherein the wear state monitor is positioned in the coiled portion of the spring.

8. The system of claim 1, wherein the spacer defines a concave cradle, wherein the coiled portion of the spring rests in the cradle.

9. The system of claim 1, wherein the sensor is configured to transmit a wireless signal to a site monitor, and wherein the wireless signal is configured to provide information relating to diminution in length of the carbon brush.

10. A system for monitoring the wear state of a carbon brush, comprising:
  a carbon brush having an upper surface, a lower surface opposite the upper surface, and a length measured from the upper surface to the lower surface, wherein the length is diminished from an initial length as the lower surface of the carbon brush wears away during use;
  a spring having a coiled portion and an elongate portion extending from the coiled portion, wherein the spring is configured to provide a force urging the lower surface of the carbon brush into contact with a rotating conductive surface of an electrical machine;
  a spacer coupled to the upper surface of the carbon brush, the spacer positioned between the coiled portion of the spring and the upper surface of the carbon brush; and
  a wear state monitor including a sensor, wherein the sensor is configured to measure an amount of diminution in the length of the carbon brush from its initial length as the lower surface of the carbon brush wears away during use;
  wherein the sensor includes an accelerometer configured to sense dynamic vibration of the carbon brush.

11. The system of claim 1, wherein the wear state monitor is configured to rotate through an arc angle as the carbon brush wears away, and wherein the arc angle correlates to the amount the carbon brush wears away.

12. The system of claim 1, wherein the wear state monitor rotates about an axis of rotation, wherein the axis of rotation is a fixed distance from an upper surface of the carbon brush as the wear state monitor rotates.

13. A system for monitoring the wear state of a carbon brush, comprising:
  a carbon brush having an upper surface, a lower surface opposite the upper surface, and a length measured from the upper surface to the lower surface, wherein the length is diminished from an initial length as the lower surface of the carbon brush wears away during use;
  a spring having a coiled portion and an elongate portion extending from the coiled portion, wherein the spring is configured to provide a force urging the lower surface of the carbon brush into contact with a rotating conductive surface of an electrical machine;
  a spacer coupled to the upper surface of the carbon brush, the spacer positioned between the coiled portion of the spring and the upper surface of the carbon brush; and
  a wear state monitor including a sensor, wherein the sensor is configured to measure an amount of diminution in the length of the carbon brush from its initial length as the lower surface of the carbon brush wears away during use;
  wherein the spacer defines a concave cradle, wherein the coiled portion of the spring rests in the cradle;
  wherein the spacer includes a pin configured to extend into a bore located within the upper surface of the carbon brush;
  wherein the wear state monitor is configured to detect an angular position of the sensor to a magnet.

14. The system of claim 13, wherein the sensor measures an angular displacement of the coiled portion of the spring.

15. The system of claim 13, wherein the sensor is configured to sense a change in a magnetic field created by the magnet.

16. The system of claim 13, wherein the sensor is configured to transmit a wireless signal to a site monitor, and wherein the wireless signal is configured to provide information relating to diminution in length of the carbon brush.

17. A method for monitoring the wear state of a carbon brush, the method comprising:
  detecting an angular position of a sensor to a magnet by sensing a change in a magnetic field created by the magnet with the sensor;
  determining an angular displacement of a coiled portion of a spring of a brush holder assembly based on the change in the magnetic field sensed by the sensor as a length of a carbon brush of the brush holder assembly diminishes during use, wherein the spring is configured to provide a force urging the carbon brush into contact with a rotating conductive surface of an electrical machine; and
  determining a wear state of the carbon brush based on the angular displacement of the coiled portion of the spring.

18. The method of claim 17, further comprising a spacer positioned between the coiled portion of the spring and the carbon brush.

19. The method of claim 18, wherein the spacer defines a concave cradle, wherein the coiled portion of the spring rests in the cradle.

* * * * *